US008805554B1

(12) United States Patent
Latham, II et al.

(10) Patent No.: US 8,805,554 B1
(45) Date of Patent: Aug. 12, 2014

(54) NOTCH FILTER FOR CONTROL SIGNALS IN PWM CONTROLLED SYSTEMS

(75) Inventors: Paul Walker Latham, II, Lee, NH (US); Stewart Gall Kenly, II, Epping, NH (US); Mansur Kiadeh, Cupertino, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 337 days.

(21) Appl. No.: 13/212,665

(22) Filed: Aug. 18, 2011

(51) Int. Cl.
*G05B 11/42* (2006.01)

(52) U.S. Cl.
USPC .............. 700/37; 700/72; 700/166; 708/300; 708/310; 455/20; 375/324

(58) Field of Classification Search
CPC .... G05B 11/42; G05B 13/024; G05B 13/042; G05B 13/038; G05B 17/02; B23K 26/032; H03H 17/06; H03H 21/0012
USPC ................ 700/37, 166, 71, 72; 708/300, 310; 375/324; 455/20; 327/558; 318/437
See application file for complete search history.

(56) References Cited

U.S. PATENT DOCUMENTS

| 5,960,091 | A | * | 9/1999 | White et al. | 381/98 |
| 6,219,196 | B1 | * | 4/2001 | Semba et al. | 360/75 |
| 6,807,405 | B1 | * | 10/2004 | Jagger et al. | 455/296 |
| 6,904,443 | B2 | * | 6/2005 | White | 708/310 |
| 7,397,212 | B2 | * | 7/2008 | Turner | 318/561 |
| 2006/0271232 | A1 | * | 11/2006 | Toyama et al. | 700/166 |
| 2008/0100245 | A1 | * | 5/2008 | Turner | 318/437 |

* cited by examiner

*Primary Examiner* — Kavita Padmanabhan
*Assistant Examiner* — Douglas Lee

(57) ABSTRACT

A notch filter includes first, second, and third difference modules, a delay module, and a gain module. The first difference module calculates a first difference between a control signal in a pulse width modulation (PWM) system and a feedback value. The second difference module calculates a second difference between the first difference and a delayed second difference. The delay module generates the delayed second difference by introducing a one period delay to the second difference, wherein the period is based on a Nyquist frequency of the control signal. The gain module generates the feedback value by applying a gain to the delayed second difference. The third difference module generates a filtered control signal by calculating a difference between the signal and the feedback value, wherein the filtered control signal is used to control an operating parameter of the PWM system.

20 Claims, 7 Drawing Sheets

NOTCH FILTER FOR CONTROL SIGNALS IN PWM CONTROLLED SYSTEMS

FIELD

The present disclosure relates to signal filtering and more particularly to a notch filter for control signals in PWM controlled systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Notch filters (also known as band-reject filters) attenuate frequency components of a signal in a given frequency range. For example, notch filters may be used in pulse-width modulated (PWM) controlled systems to remove unwanted frequency components from a control signal. FIG. 1 illustrates a notch filter 10 that receives an input signal x(n) and generates an output signal y(n) having attenuated frequency components in a given frequency range.

A first adder 12 generates a sum of the input signal x(n) and outputs of first and second amplifiers 14 and 16 having gains $-a_1$ and $-a_2$, respectively. A third amplifier 18 applies a gain $b_0$ to the output of the first adder 12. A first delay 20 applies a one unit delay ($z^{-1}$) to the output of the first adder 12. The first amplifier 14, a fourth amplifier 22, and a second delay 24 each receive the output of the first delay 20. The first amplifier 14 applies the gain $-a_1$ to the output of the first delay 20. The fourth amplifier 22 applies a gain $b_1$ to the output of the first delay 20.

The second delay 24 applies a one unit delay ($z^{-1}$) to the output of the first delay 20. The second amplifier 16 and a fifth amplifier 26 each receive the output of the second delay 24. The second amplifier 16 applies the gain $-a_2$ to the output of the second delay 24. The fifth amplifier 26 applies a gain $b_2$ to the output of the second delay 24. A second adder 28 generates the output signal y(n) by summing the outputs of the third, fourth, and fifth amplifiers 18, 22, and 26, respectively.

The transfer function H(z) performed by the notch filter 10 may be expressed as follows:

$$H(z) = \frac{b_0 + b_1 z^{-1} + b_2 z^{-2}}{1 + a_1 z^{-1} + a_2 z^{-2}}.$$

SUMMARY

A notch filter includes first, second, and third difference modules, a delay module, and a gain module. The first difference module calculates a first difference between a control signal in a pulse width modulation (PWM) system and a feedback value. The second difference module calculates a second difference between the first difference and a delayed second difference. The delay module generates the delayed second difference by introducing a one period delay to the second difference, wherein the period is based on a Nyquist frequency of the control signal. The gain module generates the feedback value by applying a gain to the delayed second difference. The third difference module generates a filtered control signal by calculating a difference between the signal and the feedback value, wherein the filtered control signal is used to control an operating parameter of the PWM system.

A method includes calculating a first difference between a control signal a pulse width modulation (PWM) system and a feedback value, calculating a second difference between the first difference and a delayed second difference, generating the delayed second difference by introducing a one period delay to the second difference, wherein the period is based on a Nyquist frequency of the control signal, generates the feedback value by applying a gain to the delayed second difference, and generating a filtered control signal by calculating a difference between the signal and the feedback value, wherein the filtered control signal controls an operating parameter of the PWM system.

A system for a switched-mode power supply includes first and second difference modules, a delay module, and a gain module. The first difference module calculates a first difference between a control signal of the switched-mode power supply and a feedback value. The second difference module calculates a second difference between the first difference and a delayed second difference. The delay module generates the delayed second difference by introducing a one period delay to the second difference, wherein the period is based on a Nyquist frequency of the switched-mode power supply. The gain module generates the feedback value by applying a gain to the delayed second difference.

A method for a switched-mode power supply includes calculating a first difference between a control signal of the switched-mode power supply and a feedback value, calculating a second difference between the first difference and a delayed second difference, generating the delayed second difference by introducing a one period delay to the second difference, wherein the period is based on a Nyquist frequency of the switched-mode power supply, and generating the feedback value by applying a gain to the delayed second difference.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
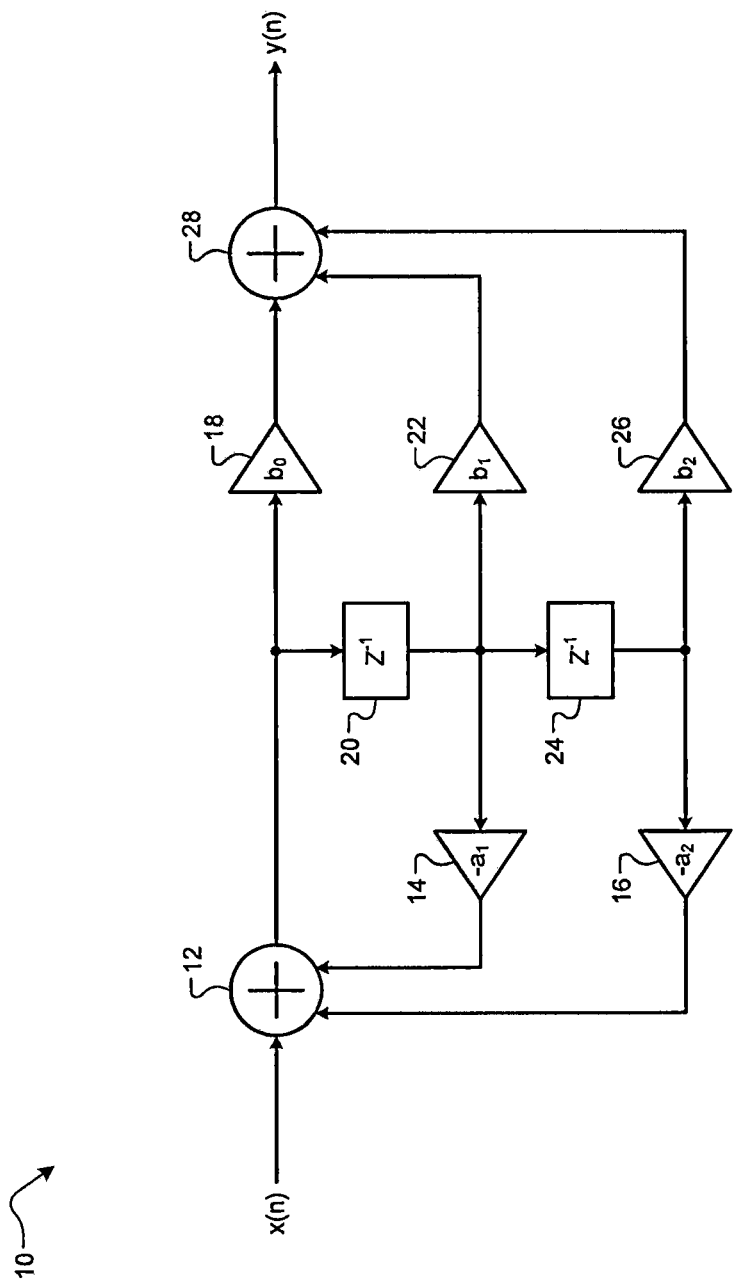
FIG. 1 is a functional block diagram of a notch filter according to the prior art.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As previously mentioned, notch filters (band-reject filters) attenuate frequency components of a signal in a given frequency range. For example, notch filters may be used in pulse-width modulated (PWM) controlled systems to remove unwanted frequency components from control signals. As previously described and shown in FIG. 1, conventional notch filters are complex and have orders of two or higher. Complex, high order filters may increase costs and/or surface area of an integrated circuit (IC).

Accordingly, an improved notch filter is presented. The notch filter is a first order filter, which decreases cost and/or surface area of an IC in comparison to conventional notch filters. The notch filter may be implemented as a first order filter because unwanted frequency components of control signals in a PWM controlled system are synchronous to the PWM frequency. Therefore, by operating the first order notch filter at a Nyquist frequency (one-half of the sampling frequency of the PWM controlled system), the first order notch filter may achieve similar performance to conventional higher order notch filters.

Figure 2A:
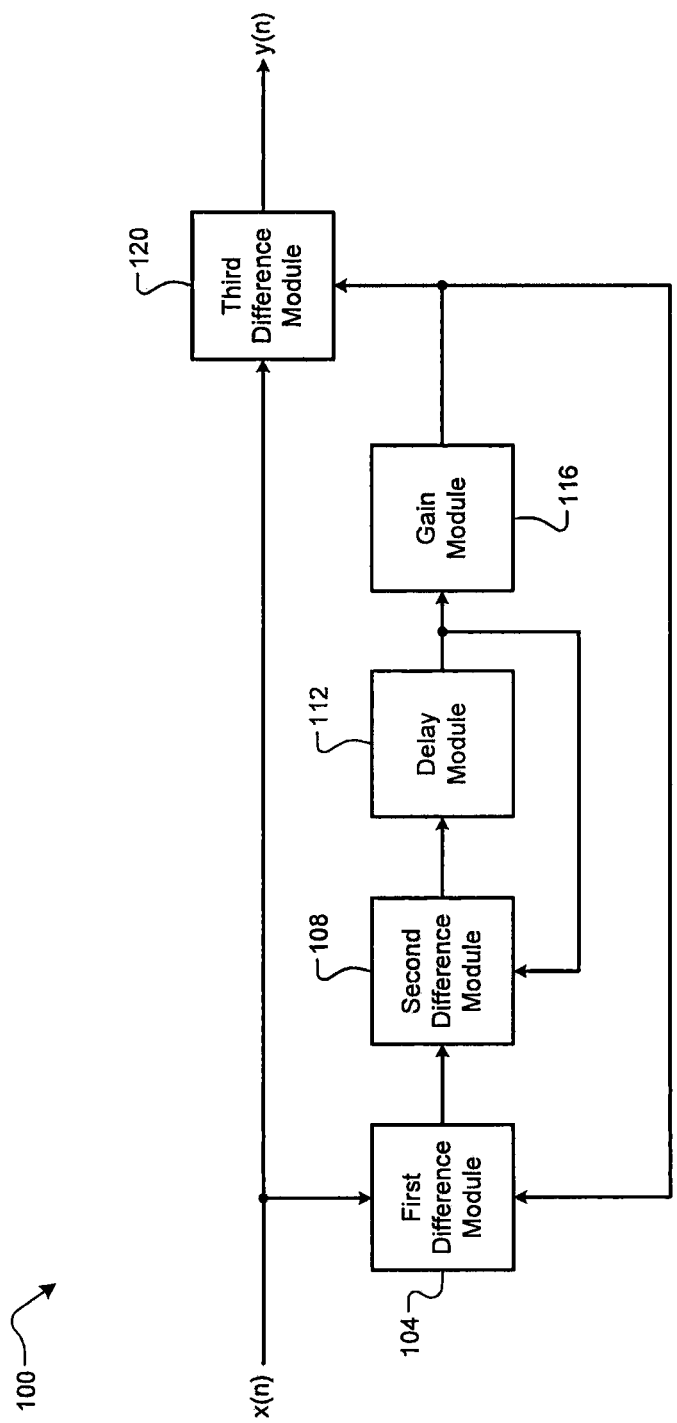
FIG. 2A is a functional block diagram of an example notch filter.

Referring now to FIG. 2A, an example notch filter 100 is shown. The notch filter 100 may also be referred to as a notch filter module 100. In addition, while a digital implementation of the notch filter 100 is shown, the notch filter 100 may also have an analog implementation. For example, an analog implementation of the notch filter 100 may include switch capacitors. The notch filter 100 receives an input control signal x(n) and outputs a filtered control signal y(n). The filtered control signal y(n) has frequency components attenuated in a given frequency range. The notch filter 100 may include a first difference module 104, a second difference module 108, a delay module 112, a gain module 116, and a third difference module 120.

The first difference module 104 calculates a first difference between the input control signal x(n) and an output of the gain module 116. The output of the gain module 116 may also be referred to as a feedback value. The second difference module 108 calculates a second difference between the first difference and an output of the delay module 112. The delay module 112 introduces a one period delay ($z^{-1}$) to the second difference. The one period delay is based on a period ($T_S$).

The period $T_S$ is based on the Nyquist frequency of the input control signal x(n), or rather one-half of the sampling frequency of the input control signal x(n). The gain module 116 applies a gain to the output of the delay module 112. For example only, the gain module 116 may include an amplifier that applies a gain $2^{-n}$. The third difference module 120 generates the output control signal y(n) by calculating a difference between the input control signal x(n) and the output of the gain module 116.

Figure 2B:
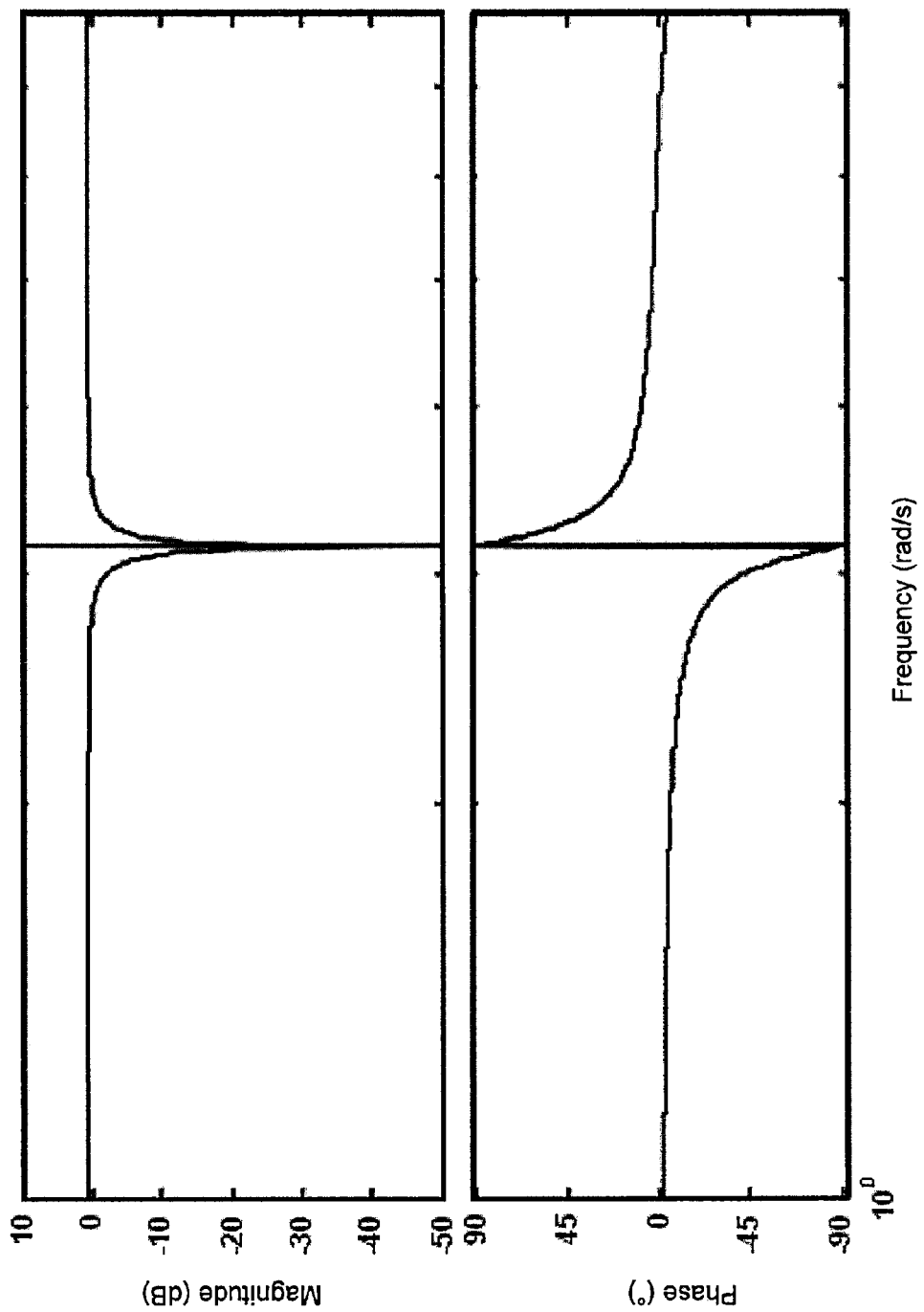
FIG. 2B is a graph illustrating simulated performance of the notch filter of FIG. 2A.

Referring now to FIG. 2B, simulated performance of the notch filter 100 is shown. The upper plot of FIG. 2B is a Bode plot illustrating the frequency response of the notch filter 100. A corresponding transfer function H(z) for the notch filter 100 (see FIG. 2A and above) may be described as follows:

$$H(z) = \frac{z + \left(1 - \frac{2}{2^n}\right)}{z + \left(1 - \frac{1}{2^n}\right)},$$

where z represents units in the z-domain, and n is a number poles. For example, n may equal one. In addition, the direct current (DC) gain ($K_{DC}$) of the notch filter 100 may be described as follows:

$$K_{DC} = \frac{2^n + 1}{2^n},$$

where n is the number of poles. As previously mentioned, n may equal one.

Figure 3:
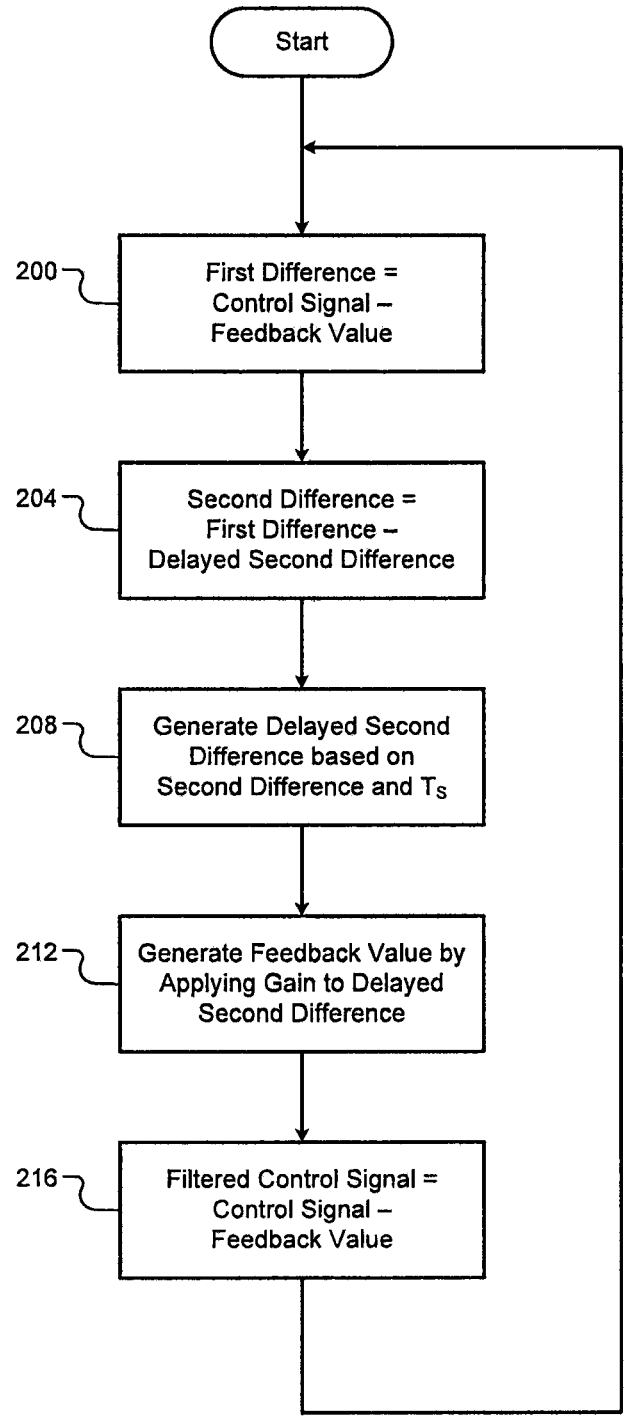
FIG. 3 is a flow diagram illustrating an example method for notch filtering a control signal in a PWM controlled system.

Referring now to FIG. 3, an example method for notch filtering a control signal in a PWM controlled system begins at 200. At 200, the method calculates a first difference between the control signal and a feedback value. At 204, the method calculates a second difference between the first difference and a delayed second difference. At 208, the method generates the delayed second difference by introducing a one period delay to the second difference, the period $T_S$ based on a Nyquist frequency, or rather one-half of a sampling rate of the control signal. At 212, the method calculates the feedback value by applying a gain to the delayed second difference. At 216, the method generates a filtered control signal by subtracting the feedback value from the control signal. Control may then return to 200.

As previously mentioned, the notch filter 100 may be implemented in any suitable PWM controlled system. For example only, PWM controlled systems may be used in, but are not limited to, telecommunications, power delivery, voltage regulation, and audio effects/amplification. One specific implementation of the notch filter 100 is power supplies, and more specifically switched-mode power supplies. In general, a power supply receives input power and generates output power that may be used to power one or more components. For example, the output power may be used to power one or more components of an IC.

The output power may be generated by manipulating the input power. Linear power supplies (or linear regulators) may generate the output power by dissipating a portion of the input power. Switched-mode power supplies, on the other hand, may control switching of transistors to charge/discharge an inductor which provides the output power. Switched-mode power supplies, therefore, may be more efficient than linear power supplies. The switching of switched-mode power supplies, however, may cause output current ripple.

The output current ripple may cause problems, particularly during high bandwidth operation. In other words, average current mode control or state-space control in a switched-mode power supply may have bandwidth limitations for maintaining a desired efficiency. Notch filters, low-pass filters, and/or finite impulse response (FIR) filters may be implemented to remove the output current ripple. As previously described, these filters are typically complex and have orders of two or higher. Complex, high-order filters may increase surface area and/or cost of an IC. Thus, the notch filter 100 of the present disclosure may be implemented in PWM controlled, switched-mode power supplies.

Accordingly, a system and a method are also presented for notch filtering of a control signal and controlling a switched-mode power supply using the filtered control signal. The switched-mode power supply may be analog or digital. For example, the control signal may include measured current, measured voltage, duty cycle, or a state of a state space controller. Other control signals, however, may also be used and therefore may also be notch filtered. The system and method may notch filter (band-reject) the control signal to generate a filtered control signal having unwanted frequency components of the control signal removed, which improves PWM control of the power supply.

Additionally or alternatively, the notch filter may have a band-pass option. More specifically, the notch filter may alternatively band-pass the frequency components of control signal corresponding to the ripple. These frequency components (the ripple) may be supplied to ripple analyzer. The ripple analyzer may determine one or more operating parameters of the power supply based on the ripple. The operating parameter(s) may then be used for improved PWM control of the power supply. For example, the operating parameter(s) may include at least one of equivalent series resistance (ESR), equivalent series inductance (ESL), and capacitance (C). Additionally, for example, the filtered control signal or the determined operating parameter(s) may be used for adaptive gain control (AGC) of the duty cycle or the PWM switching frequency of the power supply.

Figure 4:
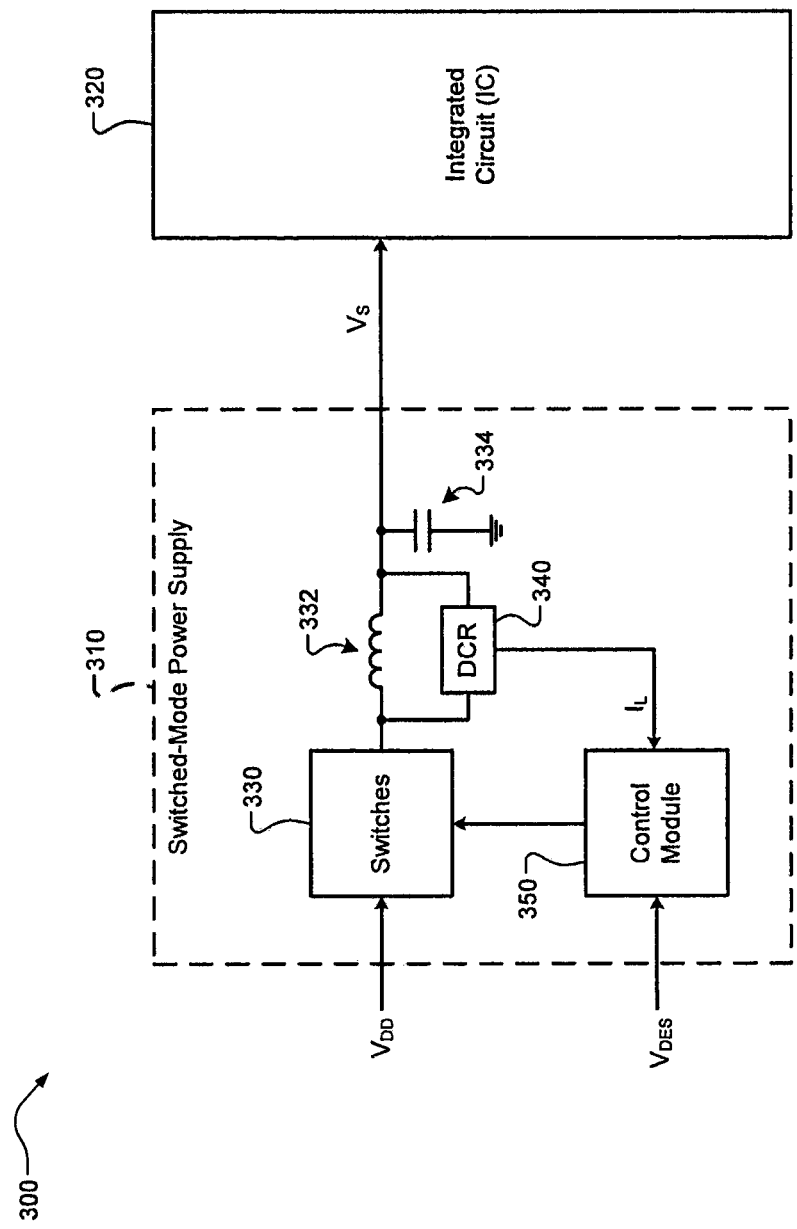
FIG. 4 is diagram illustrating an example system that includes a switched-mode power supply.

Referring now to FIG. 4, a system 300 includes a switched-mode power supply 310 that powers an IC 320. For example, the switched-mode power supply 310 may be a direct current (DC) to DC power supply (either analog or digital). The switched-mode power supply 310 receives a supply voltage ($V_{DD}$) and a user input indicating a desired output voltage ($V_{DES}$). The switched-mode power supply 310 uses the supply voltage $V_{DD}$ to generate an output voltage ($V_s$) having a magnitude approximately equal to the desired output voltage $V_{DES}$. The output voltage $V_S$ is used to power the IC 320 or other suitable device(s).

The switched-mode power supply 310 may further include one or more switches 330, an inductor 332, and a capacitor 334 connected in parallel to the inductor 332. For example, the switches 330 may be transistors such as field effect transistors (FETs). A control module 350 controls switching of the switches 330 based on the desired output voltage $V_{DES}$ and/or a control signal. Controlling the switches 330 selectively connect/disconnect the inductor 332 to the supply voltage $V_{DD}$ thereby charging/discharging the inductor 332, respectively. The capacitor 334 acts as a filter at the output.

As previously mentioned the control signal may be based on an operating parameter such as measured current, measured voltage, duty cycle, or a state of a state space controller. For example, as shown in FIG. 4, the control signal is inductor current ($I_L$) which is measured by a direct-current resistance (DCR) module 340 that performs DCR sensing. The DCR module 340 may include a resistor and a capacitor connected in parallel across the inductor 332. The inductor current $I_L$, however, may also be measured using other suitable methods. In addition, control signals based on other operating parameters may be implemented.

Figure 5:
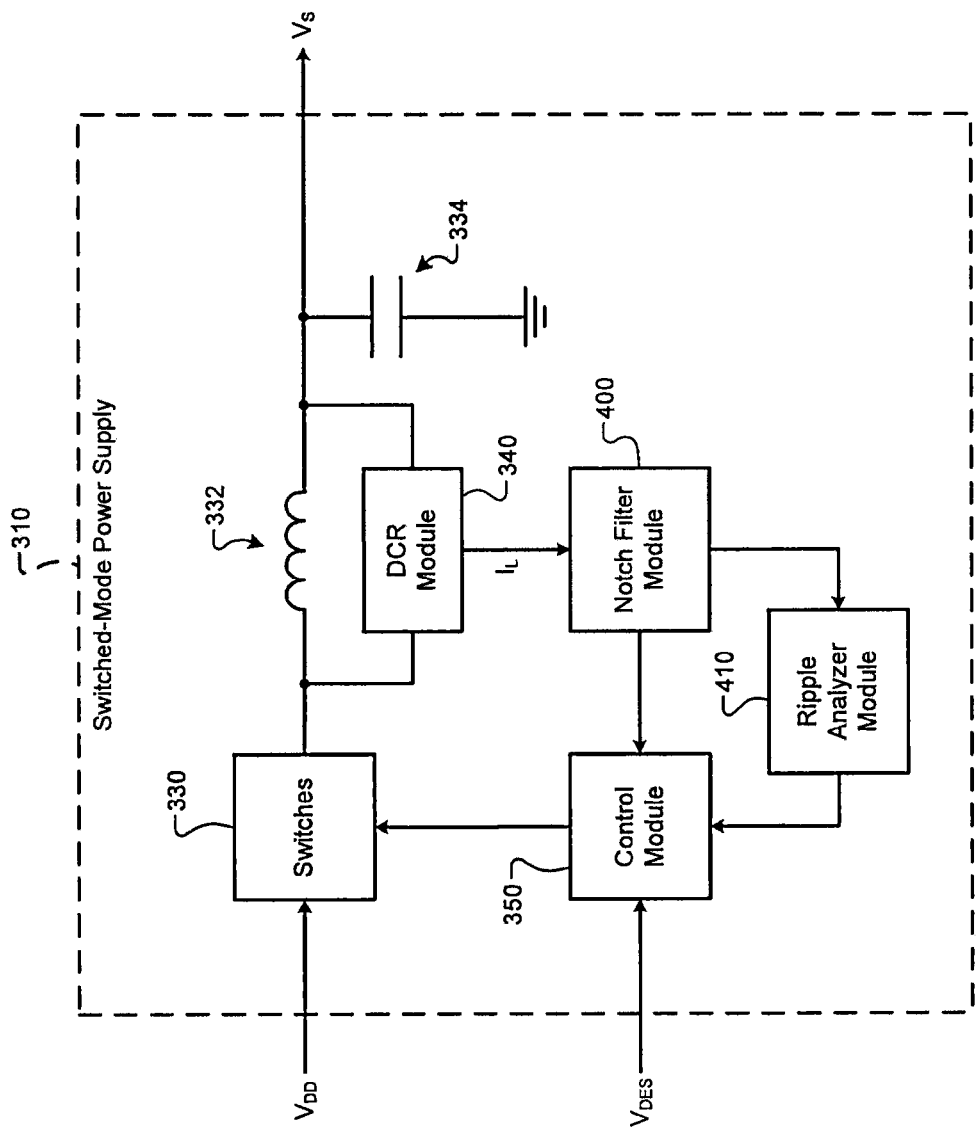
FIG. 5 is a diagram illustrating an example switched-mode power supply including a notch filter module and a ripple analyzer module.

Referring now to FIG. 5, an example of the switched-mode power supply 310 having a notch filter module 400 and a ripple analyzer module 410 is shown. When the control signal is measured inductor current ($I_L$), the notch filter module 400 may be located in-line between the DCR module 340 and the control module 350. As previously described, however, the control signal may be based on other operating parameters (measured voltage, duty cycle, a state of a state space controller, etc.) and therefore the notch filter module 400 may be located in other suitable locations in the switched-mode power supply 310.

The notch filter module 400 may filter the control signal to remove unwanted frequency components corresponding to the ripple. Rather, the notch filter module 400 may determine a frequency range corresponding to the ripple and may then generate a filtered control signal by attenuating (removing) frequency components of the control signal in the determined frequency range. The control module 350 may receive the filtered control signal and may control switching of the switches 330 based on the filtered control signal.

As previously described, however, the notch filter module 400 may alternatively band-pass the frequency components of the control signal in the determined frequency range thereby providing the ripple to the ripple analyzer module 410. The ripple analyzer module 410 determines one or more operating parameters based on the ripple. The operating parameter(s) may include at least one of equivalent series resistance (ESR), equivalent series inductance (ESL), capacitance (C), or another suitable operating parameter. The ripple analyzer module 410 may then output the determined operating parameter(s) to the control module 350. The control module 350 may then control PWM switching frequency of the switches 330 based on the determined operating parameter(s).

Figure 6:
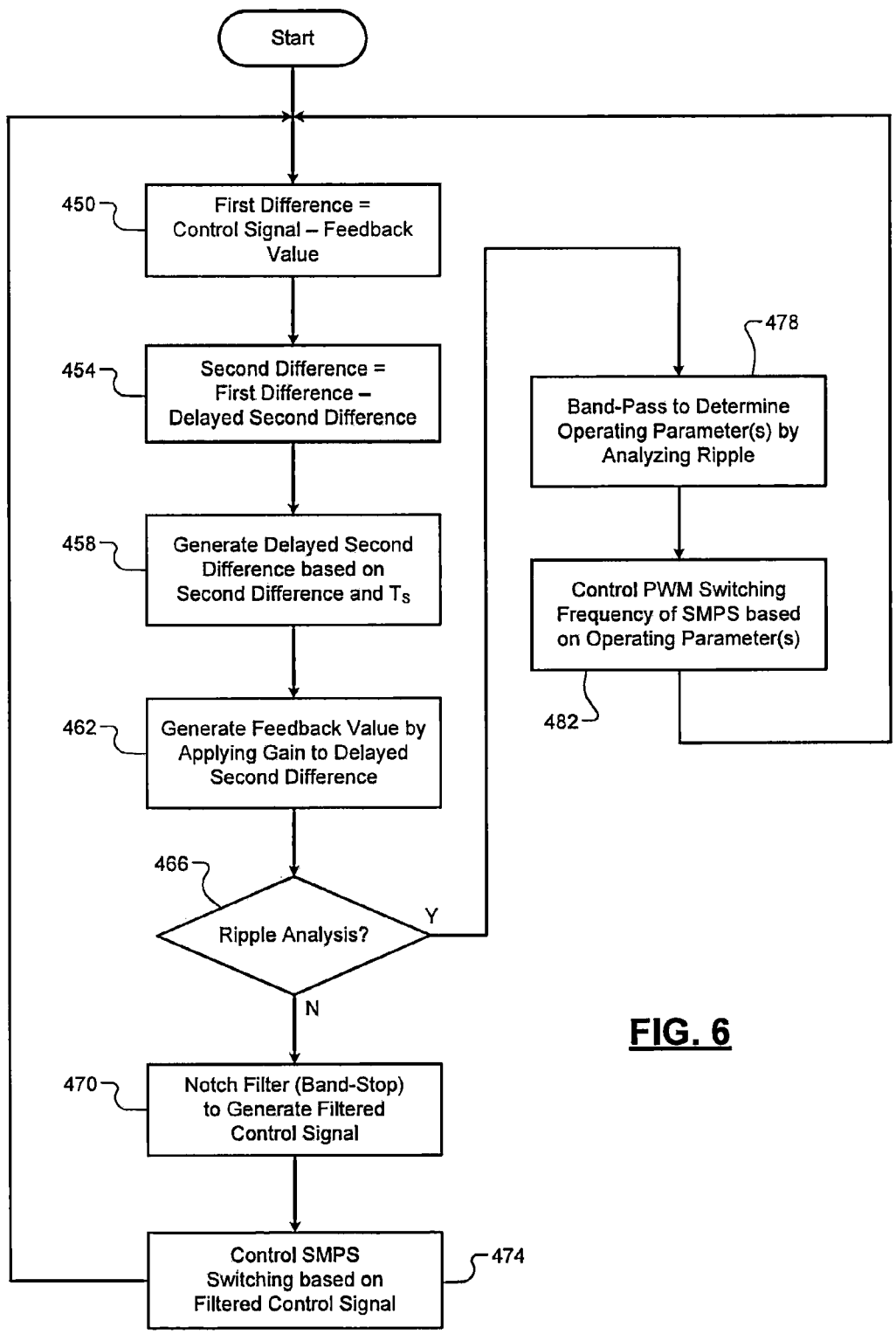
FIG. 6 is a flow diagram illustrating an example method for notch filtering of a control signal or band-rejecting and ripple analysis of the control signal, and for accordingly controlling a switched-mode power supply.

Referring now to FIG. 6, an example of a method for notch filtering of a control signal or band-rejecting and ripple analysis of a control signal and accordingly controlling a switched-mode power supply begins at 450. At 450, the control module 350 calculates a first difference between the control signal and a feedback value. At 454, the control module 350 calculates a second difference between the first difference and a delayed second difference. At 458, the control module 350 generates the delayed second difference by introducing a one period delay $T_S$ (based on the Nyquist frequency of the switched-mode power supply 310) to the second difference. At 462, the control module 350 generates the feedback value by applying a gain to the delayed second difference.

At 466, the control module 350 determines whether ripple analysis (band-pass) has been selected. For example, a user may select whether to (i) generate the filtered control signal or (ii) analyze the ripple to determine operating parameter(s). If false, control may proceed to 470. If true, control may proceed to 478. At 470, the control module 350 generates the filtered control signal by attenuating frequency components in the determined frequency range (corresponding to the ripple) of the control signal.

At 474, the control module 350 controls switching of the switches 330 (the PWM frequency) of the switched-mode power supply (SMPS) 310 based on the filtered control signal. Control may then return to 450. At 478, the control module 350 determines operating parameter(s) based on the ripple. For example, the operating parameter(s) may include ESR, ESL, C, etc. At 482, the control module 350 controls PWM switching frequency of the switches 330 of the SMPS 310 based on the determined operating parameter(s). Control may then return to 450.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A notch filter comprising:
   a first difference module that calculates a first difference between a control signal in a pulse width modulation (PWM) system and a feedback value;
   a second difference module that calculates a second difference between the first difference and a delayed second difference;
   a delay module that generates the delayed second difference by introducing a one period delay to the second difference, wherein the period is based on a Nyquist frequency of the control signal;
   a gain module that generates the feedback value by applying a gain to the delayed second difference; and
   a third difference module that generates a filtered control signal by calculating a difference between the signal and the feedback value, wherein the filtered control signal is used to control an operating parameter of the PWM system.

2. The notch filter of claim 1, wherein a relationship between the control signal and the filtered control signal is represented by transfer function:

$$H(z) = \frac{z + \left(1 - \frac{2}{2^n}\right)}{z + \left(1 - \frac{1}{2^n}\right)},$$

wherein z represents units in a z-domain, and wherein n is an integer equal to a number of poles.

3. The notch filter of claim 2, wherein the transfer function H(z) has a direct current (DC) gain:

$$K_{DC} = \frac{2^n + 1}{2^n}.$$

4. The notch filter of claim 1, wherein the operating parameter of the PWM system includes a duty cycle.

5. The notch filter of claim 1, wherein the operating parameter of the PWM system is used to perform adaptive gain control.

6. A method comprising:
   calculating a first difference between a control signal a pulse width modulation (PWM) system and a feedback value;
   calculating a second difference between the first difference and a delayed second difference;
   generating the delayed second difference by introducing a one period delay to the second difference, wherein the period is based on a Nyquist frequency of the control signal;
   generates the feedback value by applying a gain to the delayed second difference; and
   generating a filtered control signal by calculating a difference between the signal and the feedback value, wherein the filtered control signal controls an operating parameter of the PWM system.

7. The method of claim 6, wherein a relationship between the control signal and the filtered control signal is represented by transfer function:

$$H(z) = \frac{z + \left(1 - \frac{2}{2^n}\right)}{z + \left(1 - \frac{1}{2^n}\right)},$$

wherein z represents units in a z-domain, and wherein n is an integer equal to a number of poles.

8. The method of claim 7, wherein the transfer function H(z) has a direct current (DC) gain:

$$K_{DC} = \frac{2^n + 1}{2^n}.$$

9. The method of claim 6, wherein the operating parameter of the PWM system includes a duty cycle.

10. The method of claim 6, wherein controlling the operating parameter of the PWM system includes performing adaptive gain control.

11. A system for a switched-mode power supply, the system comprising:
   a first difference module that calculates a first difference between a control signal of the switched-mode power supply and a feedback value;
   a second difference module that calculates a second difference between the first difference and a delayed second difference;
   a delay module that generates the delayed second difference by introducing a one period delay to the second difference, wherein the period is based on a Nyquist frequency of the switched-mode power supply; and
   a gain module that generates the feedback value by applying a gain to the delayed second difference.

12. The system of claim 11, wherein the control signal is one of measured current, measured voltage, duty cycle, and a state of a state space controller.

13. The system of claim 11, further comprising:
a third difference module that generates a filtered control signal by calculating a difference between the control signal and the feedback value; and
a control module that performs adaptive gain control based on the filtered control signal to control a pulse-width modulated switching frequency of the switched-mode power supply.

14. The system of claim 11, further comprising:
a ripple analyzer module that determines an operating parameter of the switched-mode power supply based on the feedback value, wherein the operating parameter includes at least one of equivalent series resistance, equivalent series inductance, and capacitance; and
a control module that performs adaptive gain control based on the operating parameter to control a pulse-width modulated switching frequency of the switched-mode power supply.

15. The system of claim 13, wherein a relationship between the control signal and the filtered control signal is represented by transfer function H(z):

$$H(z) = \frac{z + \left(1 - \frac{2}{2^n}\right)}{z + \left(1 - \frac{1}{2^n}\right)},$$

wherein a direct current (DC) gain $K_{DC}$ of the transfer function H(z) is:

$$K_{DC} = \frac{2^n + 1}{2^n},$$

and wherein z represents units in a z-domain, and wherein n is an integer equal to a number of poles.

16. A method for a switched-mode power supply, the method comprising:
calculating a first difference between a control signal of the switched-mode power supply and a feedback value;
calculating a second difference between the first difference and a delayed second difference;
generating the delayed second difference by introducing a one period delay to the second difference, wherein the period is based on a Nyquist frequency of the switched-mode power supply; and
generating the feedback value by applying a gain to the delayed second difference.

17. The method of claim 16, wherein the control signal is one of measured current, measured voltage, duty cycle, and a state of a state space controller.

18. The method of claim 16, further comprising:
generating a filtered control signal by calculating a difference between the control signal and the feedback value; and
performing adaptive gain control based on the filtered control signal to control a pulse-width modulated switching frequency of the switched-mode power supply.

19. The method of claim 16, further comprising:
determining an operating parameter of the switched-mode power supply based on the feedback value, wherein the operating parameter includes at least one of equivalent series resistance, equivalent series inductance, and capacitance; and
performing adaptive gain control based on the operating parameter to control a pulse-width modulated switching frequency of the switched-mode power supply.

20. The method of claim 18, wherein a relationship between the control signal and the filtered control signal is represented by transfer function H(z):

$$H(z) = \frac{z + \left(1 - \frac{2}{2^n}\right)}{z + \left(1 - \frac{1}{2^n}\right)},$$

wherein a direct current (DC) gain $K_{DC}$ of the transfer function H(z) is:

$$K_{DC} = \frac{2^n + 1}{2^n},$$

and wherein z represents units in a z-domain, and wherein n is an integer equal to a number of poles.

* * * * *